United States Patent [19]

Janis et al.

[11] Patent Number: 5,062,045
[45] Date of Patent: Oct. 29, 1991

[54] SYSTEM FOR MAINTAINING A DOCUMENT AND ACTIVITY SELECTIVE ALTERABLE DOCUMENT HISTORY LOG IN A DATA PROCESSING SYSTEM

[75] Inventors: Frederick L. Janis, Keller; Marvin L. Williams, Lewisville; Diana S. Wang, Trophy Club, all of Tex.

[73] Assignee: International Business Machines Corporation, Armonk, N.Y.

[21] Appl. No.: 484,705

[22] Filed: Feb. 23, 1990

[51] Int. Cl.$^5$ .................... G06F 15/16; G06F 13/14; G06F 11/34

[52] U.S. Cl. .................... 364/200; 364/229; 364/230; 364/241.9; 364/242.94; 364/253.2; 364/254.2; 364/267; 371/16.5; 371/17; 371/19

[58] Field of Search ... 364/200 MS File, 900 MS File; 371/17, 19, 16.5; 370/60

[56] References Cited

U.S. PATENT DOCUMENTS

| | | | |
|---|---|---|---|
| 4,041,472 | 8/1977 | Shah et al. | 364/900 |
| 4,161,024 | 10/1979 | Joyce et al. | 364/200 |
| 4,310,883 | 1/1982 | Clifton et al. | 364/200 |
| 4,511,960 | 4/1985 | Boudreau | 364/200 |
| 4,658,351 | 4/1987 | Teng | 364/200 |
| 4,809,170 | 2/1989 | Leblang et al. | 364/200 |
| 4,872,159 | 10/1989 | Hemmady et al. | 370/60 |
| 4,953,080 | 8/1990 | Dysart et al. | 364/200 |

*Primary Examiner*—Thomas C. Lee
*Assistant Examiner*—Daniel Pan
*Attorney, Agent, or Firm*—Andrew J. Dillon

[57] ABSTRACT

A method for maintaining an alterable document history log in a data processing system having multiple resource objects which are accessible by a plurality of users within the data processing system. A history log is created and associated with each resource object for which documentation of selected activities is desired. A list of one or more specified types of activities is generated and utilized to filter all activities which take place with respect to a particular resource object in order that the occurrence of selected activities may be documented. A characterization of these activity types is recorded in association with the document history log such that subsequent users may ascertain what types of activity occurrences have been recorded. In the depicted embodiment of the present invention access to a resource object may be locked and the list of specified types of activity altered. Thereafter a new characterization of activity types is recorded in association with the document history log and access to the resource object is unlocked. In this manner a user may create a document history log associated with a particular resource object and thereafter periodically alter the list of activity types to be recorded within the document history log while also recording a characterization of the types of activities which have been recorded during specified periods of time.

9 Claims, 3 Drawing Sheets

SYSTEM FOR MAINTAINING A DOCUMENT AND ACTIVITY SELECTIVE ALTERABLE DOCUMENT HISTORY LOG IN A DATA PROCESSING SYSTEM

CROSS-REFERENCE TO RELATED APPLICATIONS

The present application is related to the following U.S. Pat. applications, each by the inventors hereof, filed of even date herewith and assigned to the assignee herein:

U.S. Pat. application Ser. No. 07/484,706, entitled "Method For Maintaining A Selective Document History Log In A Data Processing System";

U.S. Pat. application Ser. No. 07/484,701, entitled "Method For Memory Management Within A Document History Log In A Data Processing System";

U.S. Pat. application Ser. No. 07/484,704, entitled "Method For Automation Generation Of Document History Log Exception Reports In A Data Processing System"; and U.S. Pat. application Ser. No. 07/484,606, entitled "Method For Maintaining A Time Frame Selective Document History Log In A Data Processing System."

The contents of each of the above-referenced applications are hereby incorporated herein by reference thereto.

BACKGROUND OF THE INVENTION

1. Technical Field

The present invention relates in general to data processing systems and in particular to an improved method of maintaining multiple resource objects within a data processing system. Still more particularly, the present invention relates to a method for maintaining an alterable document history log in which the occurrence of any of an alterable list of selected activities, with respect to a particular resource object, may be recorded.

2. Description of the Related Art

In large modern data processing systems it is possible to create, store, and access literally thousands of documents or resource objects. Such activities may take place with regard to many users within a data processing system and it is often necessary to keep track of selected resource objects within the system to assure system integrity and maintain a record with regard to selected resource objects or documents within the system.

Document history logs are well known in the prior art. Many operating systems, database management subsystems and network subsystems marketed by International Business Machines of Armonk, NY incorporate logging facilities. For example, the Multiple Virtual Storage (MVS) operating system provides a logging system to the console operator so that all commands by the operator as well as the responses of the system are logged. Additionally, other events within the system may be written to the operator log. The logging filter in this system is set system wide for all resources within the system by the system programmer. As with all such logging systems this system may be utilized to provide a record for problem reconciliation and to provide an audit trait for security purposes.

Database management systems, such as Customer Information Control System (CICS) and Information Management System (IMS) also utilize a history log. Such history logs are typically utilized to audit events and changes within the database. These logs are then utilized to reconstruct the database in the event of an abnormal termination of the system. As above, such logs record all counts within the system based upon a filter set for the entire system by the database administrator.

Finally, certain network communications subsystems, such as VTAM, or Virtual Telecommunication Access Method utilize a history log system to log all network commands and responses. These logs are utilized for problem solving and are generally written to tape or disk storage.

In view of the above, it should be apparent that a need exists for a document history log which may be specified for individual resources within a system so that the occurrence of only selected activities with regard to particular resources will be stored within the log and wherein a user may selectively alter the list of activities so stored.

SUMMARY OF THE INVENTION

It is therefore one object of the present invention to provide an improved data processing system.

It is another object of the present invention to provide an improved method of maintaining multiple resource objects within a data processing system.

It is yet another object of the present invention to provide a method for maintaining an alterable selective document history log in which the occurrence of only selected activities with respect to a particular resource object are recorded and wherein the list of selected activities may be altered.

The foregoing objects are achieved as is now described. The method of the present invention may be utilized to maintain an alterable document history log in a data processing system having multiple resource objects which are accessible by a plurality of users within the data processing system. A history log is created and associated with each resource object for which documentation of selected activities is desired. A list of one or more specified types of activity is generated and utilized to filter all activities which take place with regard to a particular resource object, so that the occurrence of selected activities may be documented. A characterization of these activity types is recorded in association with the document history log in order that subsequent users may ascertain what types of activity occurrences have been recorded. In the depicted embodiment of the present invention access to a resource object may be locked and the list of specified types of activity altered. Thereafter, a new characterization of activity types is recorded and access to the resource object is unlocked. In this manner a user may create a document history log associated with a resource object and thereafter periodically alter the list of activity types to be recorded within the document history log, while maintaining a record of such alterations.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
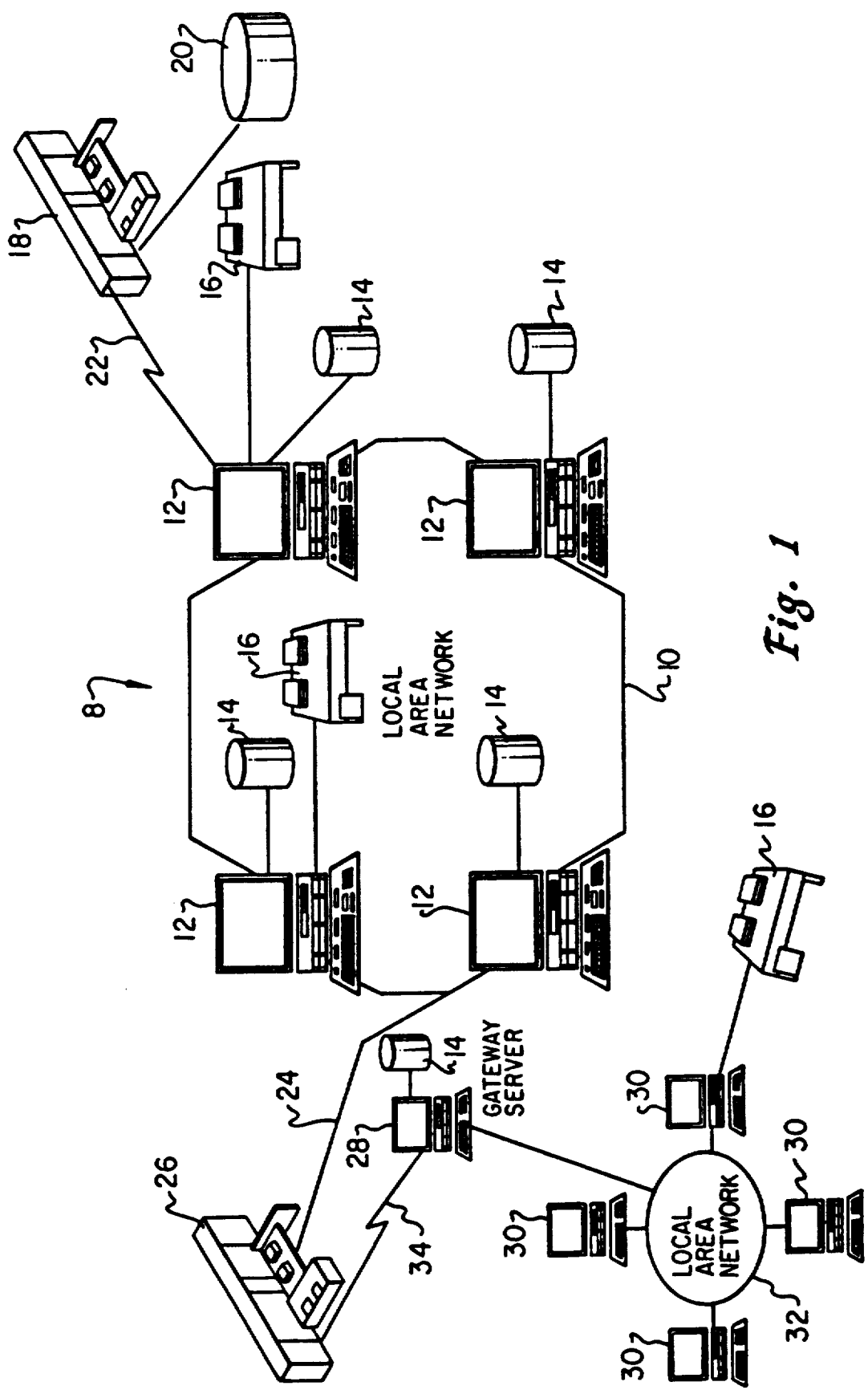
FIG. 1 depicts a pictorial representation of a distributed data processing system which may be utilized to implement the method of the present invention.

With reference now to the figures, and in particular with reference to FIG. 1, there is depicted a pictorial representation of a data processing system 8 which may be utilized to implement the method of the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Interactive Work Stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store documents or resource objects which may be periodically accessed by any user within data processing system 8. In a manner well known in the prior art, each such document or resource object stored within a storage device 14 is associated with a Resource Manager or Library Service, which is responsible for maintaining and updating all resource objects associated therewith.

Still referring to FIG. 1, it may be seen that data processing network 8 may also include multiple main frame computers, such as main frame computer 18, which may be preferably coupled to Local Area Network (LAN) 10 by means of communications link 22. Main frame computer 18 may also be coupled to a storage device 20 which may serve as remote storage for Local Area Network (LAN) 10. Similarly, Local Area Network (LAN) 10 may be coupled via communications link 24 through a subsystem control unit/communications controller 26 and communications link 34 to a gateway server 28. Gateway server 28 is preferably an individual computer or Interactive Work Station (IWS) which serves to link Local Area Network (LAN) 32 to Local Area Network (LAN) 10.

As discussed above with respect to Local Area Network (LAN) 32 and Local Area Network (LAN) 10, a plurality of documents or resource objects may be stored within storage device 20 and controlled by main frame computer 18, as Resource Manager of Library Service for the resource objects thus stored. Of course, those skilled in the art will appreciate that main frame computer 18 may be located a great geographic distance from Local Area Network (LAN) 10 and similarly Local Area Network (LAN) 10 may be located a substantial distance from Local Area Network (LAN) 32. That is, Local Area Network (LAN) 32 may be located in CA while Local Area Network (LAN) 10 may be located within TX and main frame computer 18 may be located in NY.

In known prior art systems of this type it is common for a user in one area of distributed data processing system 8 to access and/or modify a document or resource object within another portion of distributed data processing system 8. It should therefore be apparent that it would be very helpful to have a system whereby the activities of any or all of the users within distributed data processing system 8 with respect to a particular document or resource object may be recorded. However, with known document history log approaches the vast number of users within a distributed data processing system, such as the system illustrated, would clearly overwhelm a system which simply records each and every activity with regard to a particular resource object. Therefore, as disclosed in one of the referenced patent applications, it has been proposed to provide a document history log which may be specified so as to only record the occurrence of those activities which have been previously listed by the user as activities of interest. However, those skilled in the art will appreciate that such a selective document history log must include within the memory portion of the history log a characterization of those activities which are to be recorded so that subsequent users accessing the log may ascertain what types of activity occurrence have been recorded. Further, in accordance with the method of the present invention, the list of activities for which documentation is desired may be subsequently altered and a new characterization of those activities recorded within the document history log for future reference.

Figure 2:
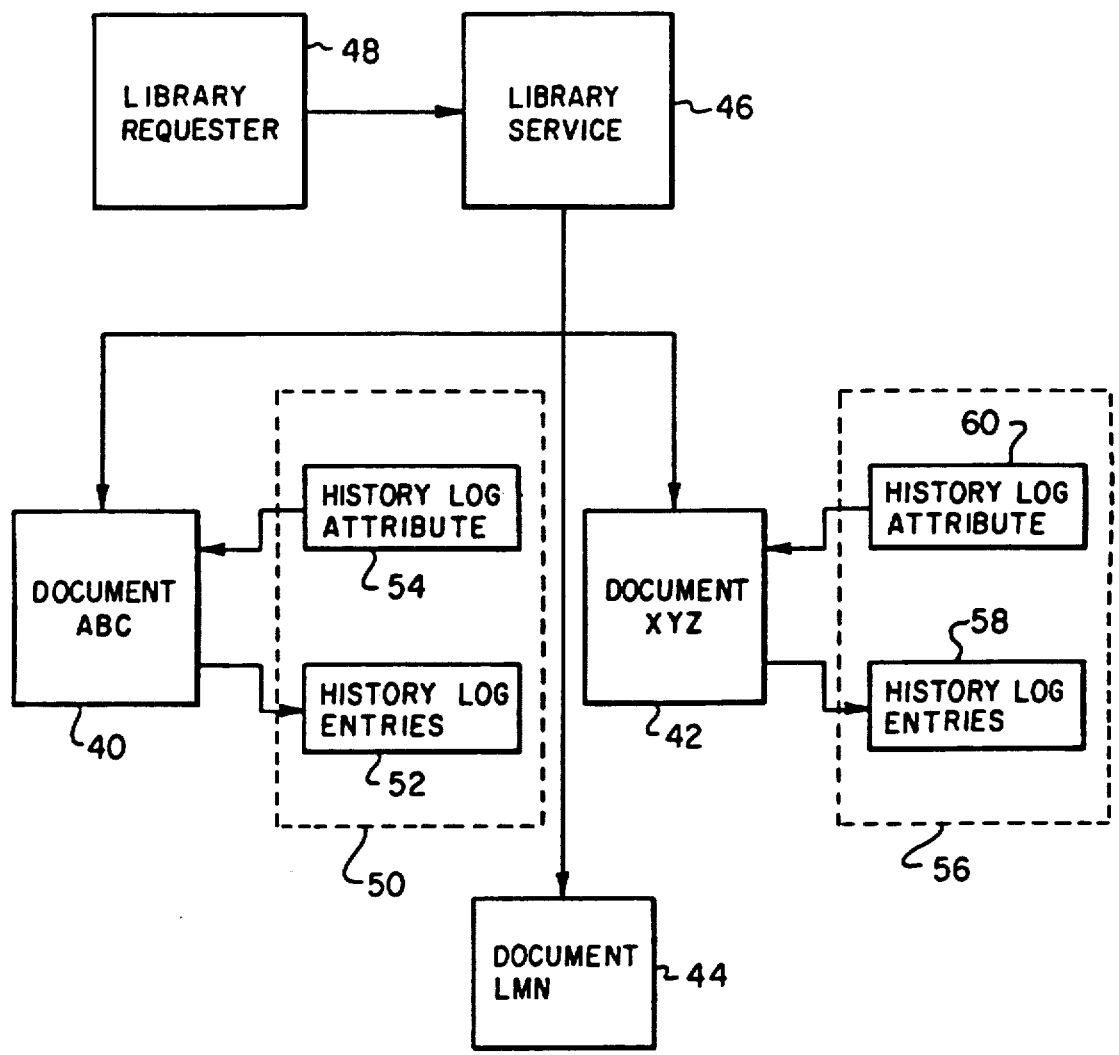
FIG. 2 depicts in block diagram form the alterable document history log system provided in accordance with the method of the present invention.

Referring now to FIG. 2, there is depicted a block diagram representation of a selective document history log implemented in accordance with the method of the present invention. As can be seen, three documents are represented. Document ABC 40, document XYZ 42 and document LMN 44 are all illustrated as being under the control of library service 46. As discussed above, library service 46 may be implemented utilizing any entity within distributed data processing system 8 (see FIG. 1) which is capable of acting as a resource manager for the documents thus illustrated. Additionally, a library requester 48 is illustrated. Library requester 48 shall correspond to any user within distributed data processing system 8 who desires to access a document or resource object controlled by library service 46.

As is illustrated, each and every document controlled by library service 46 does not require a document history log, in accordance with the method of the present invention. As is illustrated, document ABC 40 and document XYZ 42 both have associated therewith a document history log. That is, document history log 50 is associated with document ABC 40 and document history log 56 is associated with document XYZ 42. Document LMN 44 does not require a history log and no such log is illustrated.

In accordance with an important aspect of the present invention, it should be noted that each document history log thus illustrated includes two separate portions thereof. Specifically, document history log 50 includes a section labeled history log entries 52 and a section labeled history log attribute 54. Similarly, document history log 56 includes a section labeled history log entries 58 and history log attribute 60.

As those skilled in the art will appreciate, each history log entry section shall merely comprise a memory location wherein the recordation of activities with regard to an associated document may take place. However, history log attributes 54 and 60 are utilized, in accordance with the method of the present invention, to both specify those selected activities for which documentation is desired and to permanently record any alteration in the list of selected activities. For example, a user may specify that only those activities of any library requester attempting to alter a document shall be recorded. In such an application, history log attributes 54 and 60 are utilized, in accordance with the method of the present invention, to store a characterization of those activities so that future reference to the document history log may be made to ascertain what activities have been recorded therein. Further, in accordance with the method of the present invention, subsequent alterations of the activities for which documentation is required will result in a recording of a new characterization of activities within history log attributes 54 and 60, in order that users may determine that the activities which are being recorded have been altered by a user.

In this manner, it is possible to provide an alterable history log in which only selected activities of interest to the system administrator or manager are entered. Subsequent alterations of the list of selected activities for which documentation is desired will result, in accordance with the method of the present invention, in a recording of a characterization of these activities in order that a user may refer to the document history log to determine what types of activities have been recorded therein and any alteration in the characterization of those activities which has taken place. In this manner, a more efficient utilization of memory space within a document history log may be accomplished by filtering out those activities which are of no interest to the system administrator; however, the document history log may be also subsequently altered to record the occurrences of an entirely different set of activities. A document history log attribute associated with each document history log may be utilized to record such alteration so that subsequent references to the document history log may clearly determine what activities have been documented during selected periods of time.

Those skilled in the art will also appreciate, that each memory portion within a document history log may have associated therewith a protocol to follow in the event the memory space does become full. As disclosed in one of the cross-referenced applications, the protocol may specify that new activity logs shall be written over the oldest activity logs stored within the memory space. It should also be apparent that within each memory space corresponding to a history log entry it will be possible to store various parameters associated with the activities which take place with respect to a particular document. For example, user information may be stored, as well as date and time information. A version number or version reference may be stored as well as the reviser's personal name and any comments which the reviser desires to leave within the history log.

Figure 3:
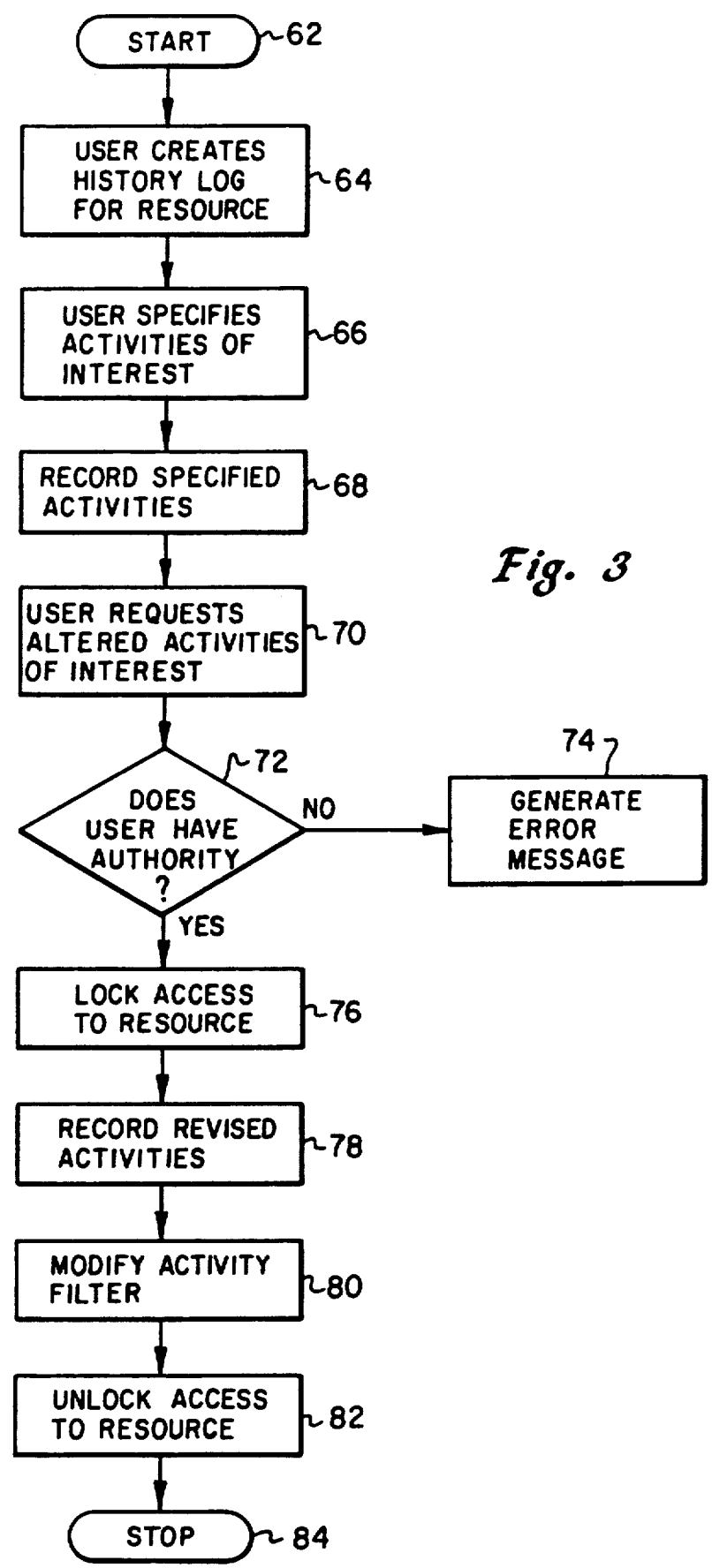
FIG. 3 is a high level flow chart depicting the method for maintaining an alterable document history log in accordance with the method of the present invention.

With reference now to FIG. 3, there is depicted a high level flow chart which illustrates the method of maintaining an alterable document history log in a data processing system in accordance with the method of the present invention. As is illustrated, the process begins at block 62 and thereafter passes to block 64 which illustrates the creation of a history log for a particular resource object by a user. Next, block 66 depicts the specification by the user of those activities of interest for which documentation is desired. Thereafter, block 68 illustrates the recording of the occurrence of the specified activities by means of the creation of an activity filter, as disclosed in one of the cross-referenced patent applications. In this manner, the user may create a history log associated with a particular resource and specify those activities of interest for which documentation is desired. Thereafter, each activity which takes place with regard to a particular resource object is compared to the list of specified activities and a decision to record or not record the occurrence of that activity is made based upon such comparison.

Next, in accordance with an important feature of the present invention, block 70 illustrates the request by a user for an alteration to the list of activities of interest created above, as depicted in block 66. Block 72 then depicts a determination of whether or not the user in question has authority to alter the list of activities of interest and if not, block 74 illustrates the generation of an error message. Those skilled in the art will appreciate that an error message may be generated in any manner well known in the art.

In the event the user in question does have authority to alter the list of activities of interest, as determined in block 72, then block 76 illustrates the locking of access to the selected resource object. By "locking of access" what is meant is access to that particular resource object is denied to all users for a temporary period of time. Thereafter, block 78 illustrates the recording in association with the history log of the list of revised activities.

Next, block 80 illustrates the modification of the activity filter which is utilized to determine whether or not an activity occurring is an activity which must be recorded within the document history log. Thereafter, block 82 illustrates the unlocking of access to the resource object in question and the process terminates, as illustrated in block 84.

Upon reference to the foregoing those skilled in the art will appreciate that the Applicants in the present invention have provided a method whereby a document history log may be created to record only selected activities which relate to a particular resource object within a data processing system. Subsequently, the list of activities of interest which are to be recorded may be altered and a characterization of the new list of activities of interest is stored in conjunction with the document history log, such that a subsequent access of the history log by another user may be utilized to determine what activities were recorded within the document history log during selected periods of time.

While the invention has been particularly shown and described with reference to a preferred embodiment, it will be understood by those skilled in the art that various changes in form and detail may be made therein without departing from the spirit and scope of the invention.

We claim:

1. A method in a data processing system of efficiently maintaining a record of activities relating to a selected one of a plurality of resource objects accessible by a plurality of users within said data processing system said method comprising the steps of:

creating a history log associated with said selected one of said plurality of resource objects;

locking access to said selected one of said plurality of resource objects;

while access to said selected one of said plurality of resource objects is locked, specifying particular activities of interest with respect to said selected one of said plurality of resource objects;

thereafter, unlocking access to said selected one of said plurality of resource objects; and recording within said history log a characterization of said specified particular activities and the occurrence of only those activities so specified.

2. The method in a data processing system of efficiently maintaining a record of activities relating to a selected one of a plurality of resource objects accessible by a plurality of users within said data processing system according to claim 1, further including the step of permitting a subsequent alteration of said specification of particular activities of interest with respect to said selected resource object.

3. The method in a data processing system of efficiently maintaining a record of activities relating to a selected one of a plurality of resource objects accessible by a plurality of users within said data processing system according to claim 1, further including the step of determining whether a particular user has authority to specify particular activities for recording.

4. The method in a data processing system of efficiently maintaining a record of activities relating to a selected one of a plurality of resource objects accessible by a plurality of users within said data processing system according to claim 2, further including the step of recording the occurrence of said subsequent alteration of said specification of particular activities of interest with respect to said selected resource object within said history log.

5. The method in a data processing system of efficiently maintaining a record of activities relating to a selected one of a plurality of resource objects accessible by a plurality of users within said data processing system according to claim 3, further including the step of generating an error message in the event said particular user does not have authority to specify particular activities of interest for recording.

6. A data processing system for efficiently maintaining a record of activities relating to a selected one of a plurality of resource objects accessible by a plurality of users in said data processing system, said data processing system comprising:

means for creating a history log associated with said selected one of said plurality of resource objects;
  means for locking access to said selected one of said plurality of resource objects;
  means for specifying particular activities of interest with respect to said selected one of said plurality of resource objects while access to said selected one of said plurality of resource objects is locked;
  means for unlocking access to said selected one of said plurality of resource objects after specifying particular activities of interest; and
  means for recording within said history log a characterization of said specified particular activities and the occurrence of only those activities to specified.

7. The data processing system for efficiently maintaining a record of activities relating to a selected one of said plurality of resource objects accessible by a plurality of users within said data processing system according to claim 6, further including means for recording the occurrence of a subsequent alteration of said specified particular activities of interest within said history log.

8. The data processing system for efficiently maintaining a record of activities relating to a selected one of said plurality of resource objects accessible by a plurality of users within said data processing system according to claim 6, further including means for determining whether a particular user has authority to specify particular activities of interest.

9. The data processing system for efficiently maintaining a record of activities relating to a selected one of said plurality of resource objects accessible by a plurality of users within said data processing system according to claim 8, further including means for generating an error message in the event said particular user does not have authority to specify particular activities of interest.

* * * * *